United States Patent

Firestone

[15] 3,668,324

[45] June 6, 1972

[54] TELEPHONE ADAPTER

[72] Inventor: Jerome Firestone, Mount Vernon, N.Y.

[73] Assignee: Saxton Products, Inc., Congers, N.Y.

[22] Filed: Feb. 26, 1971

[21] Appl. No.: 119,306

[52] U.S. Cl. .......... 179/1 PC, 179/91 R, 339/196

[51] Int. Cl. .......... H04m 1/72

[58] Field of Search .......... 179/91 R, 91 A, 1 PC; 339/256 S, 157, 192, 196, 91

[56] References Cited

UNITED STATES PATENTS 3,513,261 5/1970 Dal Monte et al. .......... 179/1 PC

*Primary Examiner*—Kathleen H. Claffy
*Assistant Examiner*—Horst F. Braunner
*Attorney*—Michael S. Striker

[57] ABSTRACT

A telephone adapter for use with a telephone terminal unit having a plurality of contacts each of which is connected with a telephone wire. The adapter has a housing provided opposite an open side thereof with a transverse wall formed with a plurality of apertures therethrough. The number of apertures corresponds to the number of contacts on the terminal unit with which the adapter is to be used. In the interior of the housing is located a plurality of axially compressible helical contact springs each aligned with one of the apertures and so dimensioned as to frictionally engage a contact pin which is pushed through a respective aperture from the outer side of the housing. A plate member of insulating material is received through the open side in the housing and has at one major surface which faces the springs projecting pins which are each conductively received in an adjacent end of one of the springs, and on the opposite major surface the plate member has contact strips which are each conductively connected with one of the pins and which, when the housing is connected by means of connecting means provided for this purpose with the terminal unit, each engage one of the contacts on the terminal unit.

10 Claims, 3 Drawing Figures

INVENTOR
JEROME FIRESTONE
BY [signature]
ATTORNEY

INVENTOR
JEROME FIRESTONE
BY [signature]
ATTORNEY

TELEPHONE ADAPTER

BACKGROUND OF THE INVENTION

The present invention relates to a telephone adapter, and more particularly to an adapter for use with a telephone terminal unit having a plurality of contacts each of which is connected with the telephone wires.

The conventional telephone installation for a single telephone utilizes a telephone terminal unit which is usually mounted on the baseboard of a room or in another similar location. Such terminal units are in form of small terminal plates of electrically insulating material which are connected by screws or the like with a support, such as a baseboard, and which are provided with contacts usually in form of contact screws. The existing telephone system utilizes four telephone wires and corresponding number of contact screws is provided, with each of the wires being connected with one of the contact screws. These are the wires, it will be understood, which are incoming to the installation. The telephone cord connecting the terminal unit with the actual telephone apparatus of the respective station also utilizes four wires, and these are also each connected with one of the contact screws because strict polarity is necessary, the incoming wires and the wires from the telephone apparatus are usually color-coded so that the two wires with a similar color are both connected to one and the same contact screw. A cupped plastic housing is connected by means of a screw to the plate-shaped member of the terminal unit, to conceal and protect the terminal screws and the ends of the wires which are connected to them.

With such an installation the telephone apparatus is permanently connected with the terminal unit, meaning that it is not possible to disconnect the apparatus and carry it to another location—for instance for connecting it at the other location with incoming telephone wires—without first having to remove the cupped housing and to loosen the screws to disconnect the wires. Evidently this is not practical in day-today use. There has, however, recently developed an increasing trend towards mobility of telephone stations; that is to say that telephone users are now frequently desirous of being able to move the telephone apparatus from one location to another, for instance from one room of their hours or apartment to another room. It may, for instance, be desired to have the telephone apparatus in the kitchen during the daytime and in a bedroom at night. This is possible by utilizing a telephone connector which replaces the terminal unit and is provided, in addition to the contact screws already present in the terminal unit with sockets each of which is connected with one of the contact screws. The incoming telephone wires are then connected to the contact screws as before and the telephone connector is installed on the baseboard or in another desired location in place of the previously present terminal unit. The wires to the telephone apparatus have connected to them a male telephone plug which has pins receivable in the female sockets of the telephone connector so that it is now a simple manner to connect or disconnect the telephone simply by inserting the pins of the telephone plug into the female sockets of the telephone connector, or removing them therefrom. In the latter case the telephone apparatus can be carried to another location and the pins of the plug can then be inserted into another but similar telephone connector which is installed at this other location.

Such units are now widely offered for so-called do-it-yourself installation. They do, however, have the obvious disadvantage that they require a certain amount of facility with tool and at least some familiarity with the system of telephone wires, because to install such telephone connectors and telephone plugs it is necessary first to disconnect the wires from the terminal unit, to remove the same, to install in its place the telephone connector and to connect the incoming wires thereto, and then to connect the telephone plug to the wires which lead to the telephone apparatus itself. Many people are not qualified to carry out this type of work, or fear that they might make mistakes in so doing. Thus it is desirable to further simplify the conversion of a stationarily installed telephone apparatus to portable status.

SUMMARY OF THE INVENTION

It is, accordingly, an object of the present invention to provide for such further simplification.

More particularly it is an object of the present invention to provide an adapter for use with a telephone terminal unit having a plurality of contacts each connected with a telephone wire, the purpose of the adapter being to permit conversion of a previously stationarily installed telephone apparatus to portable state without requiring the connection and disconnection of wires and the like.

A concomitant object of the invention is to provide such an adapter which is simple in its construction and easy to use, and which because of the simplicity of its construction can be manufactured and sold inexpensively.

A further object of the invention is to provide a combination of such an adapter with a telephone terminal unit with which it cooperates.

Still another object of the invention is to provide a combination of the novel adapter with a telephone terminal unit and, in cooperation with both, of a telephone connector which facilitates and increases the range of utilization of a telephone installation.

In pursuance of the above objects, and of others which will become apparent hereafter, one feature of the invention resides in an adapter for use with a telephone terminal unit having a plurality of contacts each connected with a telephone wire. Briefly stated, the novel adapter comprises housing means having an interior, an opening and a transverse wall opposite the opening and which has an inner and outer side. A plurality of apertures are provided in the wall corresponding to the plurality of contacts and each extending from the outer side to the inner side. Contact spring means are located in the interior of the housing means and are each adapted to be conductively engaged by a contact pin inserted through one of the apertures from the outer side of the wall. A plate member of electrically insulating material is received in the interior of the housing means through the opening thereof and has two major surfaces and a corresponding plurality of contact members, each of which is exposed at both of the major surfaces. Finally, there is provided connecting means for releasably connecting the housing means with a terminal unit so that the latter is at least partly received through the opening in the housing means, with the contact members each engaging one of the contacts of the terminal unit and also one of the contact spring means, respectively.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
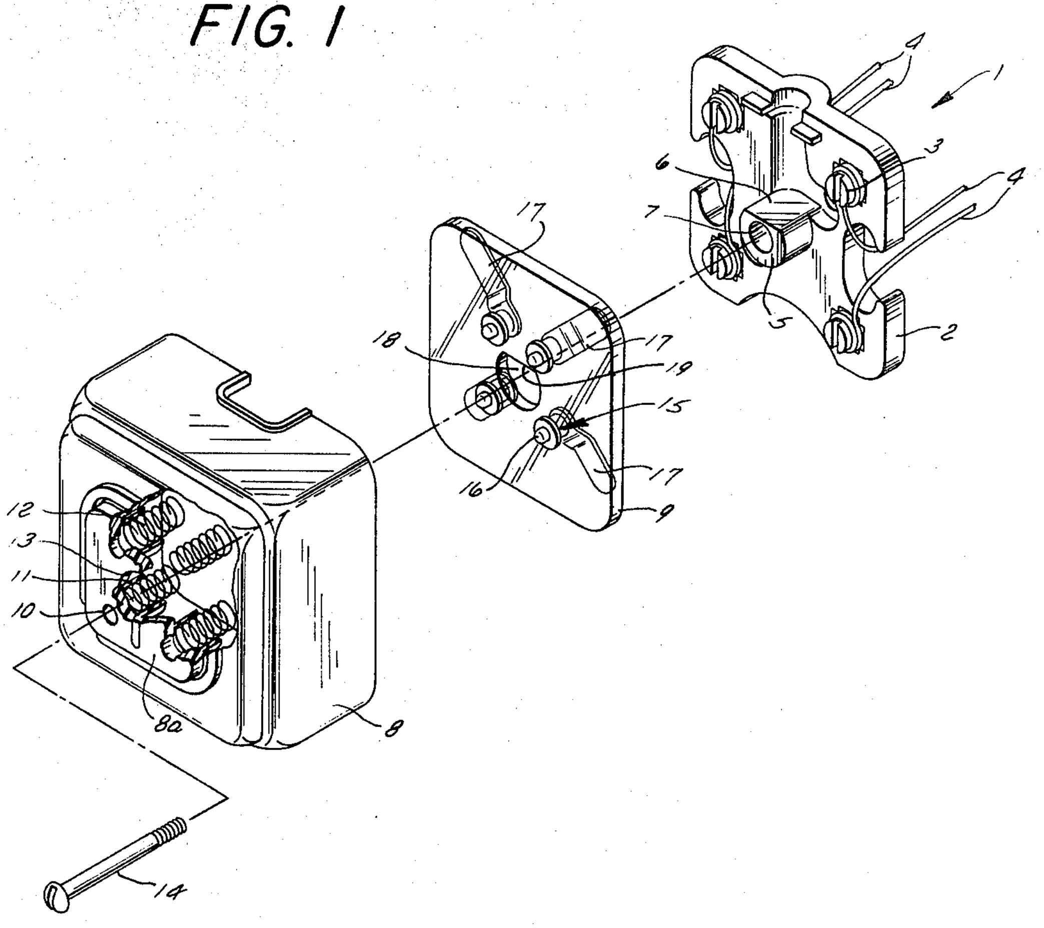
FIG. 1 is an exploded perspective view illustrating the novel adapter according to the present invention, in conjunction with an existing telephone terminal unit.

Discussing now firstly the embodiment illustrated in FIG. 1 it will be seen that my novel adapter as shown there in an exemplary embodiment is utilized with an existing telephone terminal unit 1. This terminal unit has a plate member or base member 2 which is secured in suitable manner to a non-illustrated support and which normally has connected thereto a cupped housing (omitted for clarity) which must be removed when the adapter according to the present invention is to be used with the terminal unit. The plate-shaped base portion 2 is provided with a plurality (here four) of contacts in form of screws 3, and each of the contacts or screws 3 has connected thereto an incoming telephone wire 4. The portion 2 is further provided on its exposed face with a projecting boss 5 having a flat facet 6 and an internally threaded recess 7 in which normally a screw engages which holds the non-illustrated cover over the portion 2.

Just as there are four telephone wires 4 shown coming into and being connected with the terminal unit 1, the telephone cord which is connected with an individual telephone apparatus also is composed of four wires each of which will normally be connected with one of the screws 3, so that each screw has two wires connected to it. To utilize the adapter of the present invention it is merely necessary to disconnect the wires which lead to the telephone unit per se.

Now, the novel adapter according to the embodiment of FIG. 1 of the invention can be utilized. It comprises a housing 8 having an open side in which there is receivable a plate member 9 of electrically insulating material. Opposite its open side the housing 8 has a transverse wall **8*a* which is provided with a plurality of aperaturs—namely four in correspondence with the four contact screws 3—each having a first or outer portion 10 of a smaller diameter and a second or inner portion 11 of larger diameter. The housing 8 is shown partially broken away to illustrate more clearly that there is provided a corresponding number of axially compressible helical contact springs 12 each of which is received in one of the larger portions 11 so as to be axially aligned with the respective smaller portion 10. The wall 8*a* is further provided with an opening 13 through which a screw 14 can be passed which can subsequently mesh with the internal threads of the opening 7 in the terminal unit 1. The springs 12 are of course to be retained against withdrawal outwardly through the smaller-diameter apertures portions 10, and therefore have an outer diameter which is greater than that of the smaller-diameter portions 10 but an inner diameter which is at least slightly smaller than the diameter of the portions 10 so that contact pins inserted through the portions 10 are certain to be frictionally engaged by the respective springs 12**.

The plate member 9 may be made, as indeed the housing 8 may be made, of synthetic plastic material. It has two major surfaces one of which faces the interior of the housing and the other of which faces the exposed side of the terminal unit 1. The plate member 9 is provided with a plurality of contact members 15 each having a pin-shaped portion 16 exposed at the side which faces the interior of the housing 8, and a substantially strip-shaped portion 17 at the side which is to face the exposed side of the terminal unit 1. Suitable screws may for instance connect the portions 17 and 16 with one another so that they will be in conductive engagement. When the plate member 9 is received in the open side of the housing 8, the pins 16 will each be conductively received in one of the springs 12 and thus establish connection via the springs 12 with the male contact pins of a telephone connector when such contact pins are inserted into the smaller-diameter aperture portions 10. The plate member 9 is further provided with a central opening 18 having a flat facet 19 which cooperates with the facet 6 on the boss 5 of the base portion 2 of the terminal unit 1, so that the plate member 9 and the portion 2 are keyed to one another and proper polarity is assured. Of course, the arrangement of the aperture portions 10 is such that the pins of a telephone plug can be inserted into them only in a predetermined manner, details of which need not be entered into for purposes of this discussion because this is well known to those skilled in the art. In this manner polarity is maintained as long as polarity is obtained between the contact members of the plate member 9 and the connecting screws 3 of the terminal unit 1. It is now simply necessary to place the housing 8 with the plate member 9 received in it over the portion 2 whereby the contact portions 17 each engage one of the contact screws 3 and make electrical contact therewith. Then the screw 14 is threaded into the tapped aperture 7 of the boss 5 and there is now provided a telephone jack with which a telephone apparatus can be connected or disconnected at will, as long as a known male telephone plug is connected to the free end of the wire or line leading to the telephone apparatus.

Figure 2:
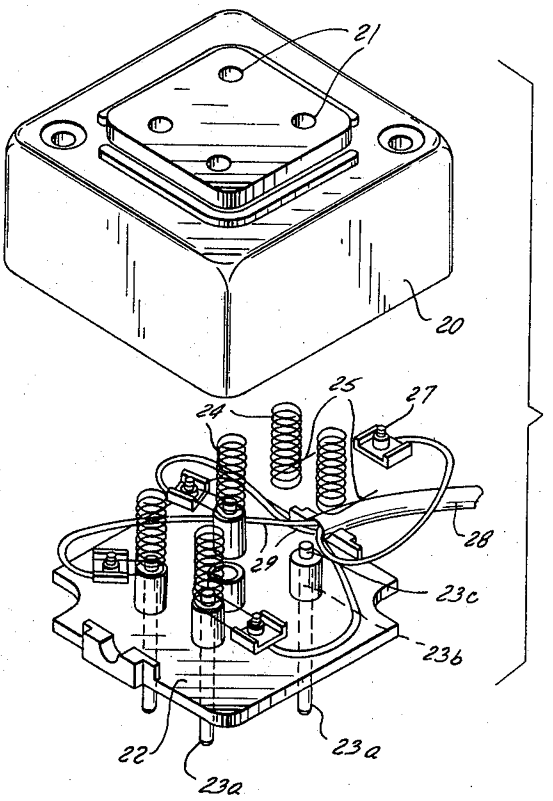
FIG. 2 is an exploded perspective view illustrating a telephone connector with which my novel adapter may also be used.
Figure 3:
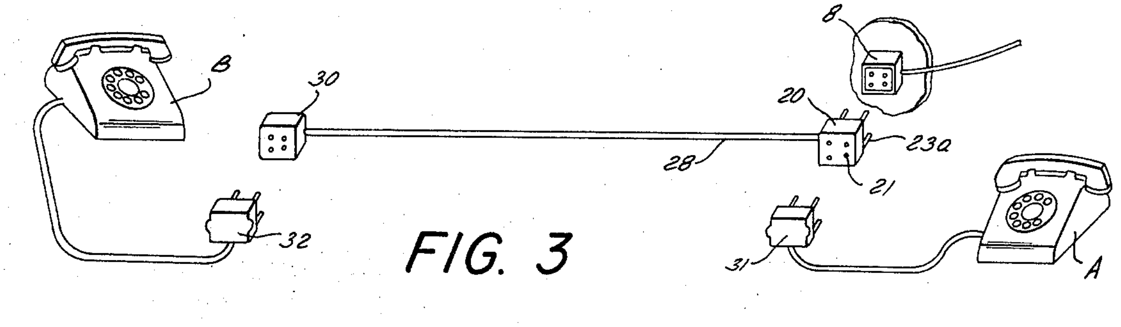
FIG. 3 is a diagrammatic view illustrating one possibility of use of my novel adapter in conjunction with an existing terminal unit and a telephone connector such as shown in FIG. 2.

As already pointed out, the novel adapter can be used to good advantage with the telephone connector shown in FIG. 2, with an exemplary possibility of use having been illustrated in FIG. 3. The telephone connector of FIG. 2 is disclosed in detail in my copending application, Ser. No. 88,013, filed on Nov. 8, 1970 under the title "TELEPHONE CONNECTOR". As FIG. 2 shows it has a cupped housing 20 having an open side which is normally closed by a plate-shaped portion 22 whereas the opposite side of the housing 20 is provided with four openings 21. Projecting inwardly to the interior of the housing 20 from the plate-shaped portion 22 are four projections of insulating material, which may be of one piece with the remainder of the portion 22, and embedded in these projections are male contact pins each having a portion **23*a* projecting beyond the opposite side of the plate-shaped portion 22, a portion 23*b* which is actually embedded in the respective projection, and a portion 23*c* which is exposed beyond the respective projection in the interior of the housing 20. In this connector, also, there are provided helical contact springs 24 one end of which is slipped over one of the portions 23*c* and the opposite end of which is axially aligned with the respective one of the openings 21, for instance by being inserted into an inner portion of the openings 21 which has a larger diameter than the illustrated outer portion. In the region of that end which is adjacent the bosses the springs 24 each carry clamps 26, metallic elements which are each provided with a tapped bore into which a screw 27 is threaded so that between the head of the screw 27 of a telephone wire 28 can be clamped in conductive relationship. The portion 22 is retained in suitable manner in the housing 20**.

If, now, the telephone wire 28 is the wire which leads to the individual telephone unit or apparatus, that is if the connector of FIG. 2 is used in lieu of a conventional telephone plug, then the portions **23*a* of the male contact pins can be inserted through the aperture portions 10 of the novel adapter shown in FIG. 1, thereby establishing contact via the springs 12, the portions 16 and the portions 17 with the respective contact screws 3 of the existing terminal unit 1. This possibility is shown by way of example in FIG. 3 where like reference numerals designate like elements as in the preceding two Figures. FIG. 3 differs from what has just been described in only one respect, namely in that the telephone wire 28 is not connected directly with one of the two telephone apparatuses A and B shown in FIG. 3, but instead has at its opposite end a connector 30 similar to the one shown in FIG. 2. Thus the wire 28 may for instance be stretched behind the headboard of a bed from one side of the bed to the other if it is desired to provide the telephone apparatuses A and B at night tables located at opposite sides of the bed. It is now merely necessary to connect to the telephone wires which lead to the respective telephone apparatuses A and B respective conventional telephone plugs 31 and 32, respectively, and to insert the male contact pins of these plugs into the openings 21 of the connector 30. This makes it possible, by first converting the existing telephone terminal unit by means of the adapter illustrated in FIG. 1, and by further utilizing the telephone connector of FIG. 2 in conjunction with the adapter of FIG. 1**, to install two telephone apparatuses A and B in such a manner that they can be readily connected and disconnected from a single terminal unit.

The advantages obtained according to the present invention are clearly obvious, not only in terms of convenience but also in terms of the significant reduction in the level of skill required for a person wishing to convert his telephone installation himself and not being trained in the field, to carry out such conversion.

It will be understood that each of the elements described above, or two or more together, may also find a useful application in other types of constructions differing from the types described above.

While the invention has been illustrated and described as embodied in a telephone adapter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. An adapter for use with a telephone terminal unit having a plurality of contacts each connected with a telephone wire, comprising housing means having an interior, an opening, and a transverse wall opposite said opening and which has an inner and an outer side; a plurality of apertures in said wall corresponding to said plurality of contacts and each extending from said outer side to said inner side; contact spring means in said interior and each adapted to be conductively engaged by a contact pin inserted through one of said apertures from said outer side; a plate member of electrically insulating material received in said interior through said opening and having two major surfaces and a corresponding plurality of contact members each exposed at both of said major surfaces; and connecting means for releasably connecting said housing means with a terminal unit so that the latter is at least partly received through said opening, with said contact members each engaging one of said contacts and one of said contact spring means, respectively.

2. An adapter as defined in claim 1, wherein said apertures each have an outer portion of smaller diameter extending inwardly from said outer side, and an inner portion of larger diameter extending from said inner side to a respective outer portion; said contact spring means comprising a plurality of axially compressible helical contact springs each partially received in and aligned with one of said inner portions and having an outer diameter and an inner diameter which are respectively greater and at least slightly smaller than said smaller diameter of said outer portion.

3. An adapter as defined in claim 1, wherein said housing means is composed of electrically insulating material.

4. An adapter as defined in claim 2, wherein said contact members each have one portion projecting from one of said major surfaces for engagement with a respective contact spring, and an other portion conductively connected with said one portion and projecting from the other of said major surfaces for engagement with a respective contact of a terminal unit.

5. An adapter as defined in claim 4, wherein said one portion are pins each of which is receivable in one of said helical contact springs in conductive engagement therewith.

6. An adapter as defined in claim 5, wherein said other portions are of substantially strip-shaped configuration.

7. An adapter as defined in claim 1, in combination with a telephone terminal unit comprising a terminal body, and a plurality of contacts each connectable with a telephone wire and engageable by one of said contact members in electrically conductive relationship therewith in response to releasable connection of said housing means with said terminal unit.

8. An adapter as defined in claim 7; and further comprising cooperating keying portions on said terminal body and said adapter so that the latter can be releasably connected with said terminal unit only in a predetermined relative orientation.

9. An adapter as defined in claim 1, wherein said housing means and said plate member are composed at least predominantly of synthetic plastic material.

10. An adapter as defined in claim 7, in combination with a telephone connector having a plurality of male contact pins each receivable in one of said apertures in conductive engagement with said contact spring means, and a similar plurality of female sockets each conductively connected with one of said male contact pins.

* * * * *